(12) United States Patent
Li et al.

(10) Patent No.: US 12,164,141 B2
(45) Date of Patent: Dec. 10, 2024

(54) HOUSEHOLD LIGHTING LAMP AND CONTROL METHOD FOR HOUSEHOLD LIGHTING LAMP

(71) Applicant: ETI Solid State Lighting (Zhuhai) Ltd., Guangdong (CN)

(72) Inventors: Tinghong Li, Zhuhai (CN); Caiwu Zhao, Zhuhai (CN); Weiwei Wu, Zhuhai (CN)

(73) Assignee: ETI Solid State Lighting (Zhuhai) Ltd., Zhuhai (CN)

( * ) Notice: Subject to any disclaimer, the term of this patent is extended or adjusted under 35 U.S.C. 154(b) by 0 days.

(21) Appl. No.: 17/918,030

(22) PCT Filed: Aug. 3, 2020

(86) PCT No.: PCT/CN2020/106585
§ 371 (c)(1),
(2) Date: Oct. 10, 2022

(87) PCT Pub. No.: WO2021/208297
PCT Pub. Date: Oct. 21, 2021

(65) Prior Publication Data
US 2023/0130468 A1    Apr. 27, 2023

(30) Foreign Application Priority Data

Apr. 13, 2020 (CN) .......................... 202010286185.2

(51) Int. Cl.
*F21V 8/00* (2006.01)
(52) U.S. Cl.
CPC ................... *G02B 6/0073* (2013.01)

(58) Field of Classification Search
CPC ...... F21S 8/00; F21S 8/02; F21S 8/026; F21S 8/03; F21S 8/04–046;
(Continued)

(56) References Cited

U.S. PATENT DOCUMENTS 10,146,002 B2 * 12/2018 Lerman .................. G02B 6/005
2012/0294007 A1 * 11/2012 Matsumoto ............. F21V 23/00
362/249.02

FOREIGN PATENT DOCUMENTS

CN          203131480 U     8/2013
CN          103742843 A     4/2014
(Continued)

OTHER PUBLICATIONS

Patent Cooperation Treaty: International Search Report and Written Opinion for PCT/CN2020/106585; Jan. 12, 2021; 12 pages.

*Primary Examiner* — Jason M Han (57) ABSTRACT

A household lighting lamp and a control method for a household lighting lamp. The household lighting lamp comprises a lamp holder, a main light-emitting component, and a secondary light-emitting component; the front side of the lamp holder is a front panel, and the rear side of the lamp holder is a mounting part; the main light-emitting component is disposed in front of the lamp holder, the secondary light-emitting component is disposed behind and/or at the side of the lamp holder, and the main light-emitting component and secondary light-emitting component are electrically connected to a control circuit. The illumination of the lighting lamp can be conveniently adjusted, and the light sensation of the lamp is comfortable and can be adapted to requirements of a user in different scenarios.

6 Claims, 5 Drawing Sheets

(58) Field of Classification Search
CPC ... F21V 19/001–007; F21V 21/02–049; F21V 23/04–0442; F21Y 2103/33; F21Y 2113/00–17; F21Y 2115/10; G02B 6/0028–0086

See application file for complete search history.

(56) References Cited

FOREIGN PATENT DOCUMENTS

| | | |
|---|---|---|
| CN | 204141417 U | 2/2015 |
| CN | 204300893 U | 4/2015 |
| CN | 206555854 U | 10/2017 |
| CN | 208204774 U | 12/2018 |
| CN | 111380001 A | 7/2020 |
| JP | 2007214096 A | 8/2007 |

\* cited by examiner

HOUSEHOLD LIGHTING LAMP AND CONTROL METHOD FOR HOUSEHOLD LIGHTING LAMP

CROSS-REFERENCE TO RELATED APPLICATIONS

This application is a U.S. National Phase application submitted under 35 U.S.C. § 371 of Patent Cooperation Treaty application serial no. PCT/CN2020/106585, filed Aug. 3, 2020, and entitled HOUSEHOLD LIGHTING LAMP AND CONTROL METHOD FOR HOUSEHOLD LIGHTING LAMP which application claims priority to Chinese patent application serial no. 202010286185.2, filed Apr. 13, 2020.

Patent Cooperation Treaty application serial no. PCT/CN2020/106585, published as WO 2021/208297 A1, and is incorporated herein by reference.

TECHNICAL FIELD

The present disclosure relates to a lighting field, in particular to a household lighting lamp and a method for controlling a household lighting lamp.

BACKGROUND

In a field of home decoration, household lamps have far beyond ordinary lighting effects. While the household lamp meets a basic lighting function, a using scenario of the lamp and a user's comfort to light may be also considered.

The light comfort of the user is often ignored in conventional lamps, an environmental effect of lights is poor, thus affecting the user's experience.

SUMMARY

The purpose of the present disclosure is to provide a household lighting lamp and a control method for a household lighting lamp. The present disclosure can easily adjust lights of the lamp, a good light comfort can be obtained, which can meet users' requirements for different scenarios.

The technical solutions are provided as follows.

A household lighting lamp includes a lamp holder, a main light-emitting component and a secondary light-emitting component, a front side of the lamp holder is provided with a front panel, a rear side of the lamp holder is provided with a mounting portion, the main light-emitting component is provided in front of the lamp holder, the secondary light-emitting component is provided at a rear and/or side of the lamp holder, both the main light-emitting component and the secondary light-emitting component are electrically connected to a control circuit.

In one of the embodiments, the main light-emitting component includes a main light source and a main light guiding element, the main light source is electrically connected to the control circuit, and the main light guiding element is located in front of the lamp holder.

In one of the embodiments, the main light guiding element is a main light guiding plate, the main light source is provided at a lateral edge of the main light guiding element, and forms a light-guiding connection with the main light guiding element.

In one of the embodiments, the household lighting lamp further comprising a frame, the main light source is provided on an inner side of the frame and surrounds an outer edge of the main light guiding plate.

In one of the embodiments, the secondary light-emitting component includes a secondary light source and a secondary light guiding element, the secondary light source is electrically connected to the control circuit, the secondary light guiding element is provided in front of or at a side of the lamp holder, and the secondary light source forms a light-guiding connection with the secondary light guiding element.

In one of the embodiments, an annular boss is provided on the rear side of the lamp holder, the secondary light source is located on the annular boss, and the secondary light guiding element is located on the rear and/or side of the annular boss.

In one of the embodiments, an outer periphery of the annular boss has a circumferential side wall, the secondary light source is a light strip wound on the circumferential side wall, the secondary light guiding element is a light guiding ring latched on an outer side of the circumferential side wall.

In one of the embodiments, the secondary light guiding element is an annular cover plate provided on the rear side of the lamp holder, a front side of the annular cover plate is provided with an annular groove, the secondary light source is provided in the annular groove, the annular cover plate at least has a lateral light guiding edge.

In one of the embodiments, the annular cover plate includes a rear light guiding edge.

In one of the embodiments, the lamp holder has an outer edge, the main light-emitting component comprises a main light source and a main light guiding element, the secondary light-emitting component comprises a secondary light source and a secondary light guiding element, a distance between the main light guiding element and an outer edge is less than a distance between the secondary light guiding element and the outer edge.

A method for controlling a household lighting lamp, includes receiving, by a control circuit, a control signal; when the control signal is a "main light on" signal, turning on a main light source, turning off a secondary light source, wherein light is transferred by the main light source to a main light guiding element, and the main light guiding element guides the light towards a front of the lighting lamp; and when the control signal is a "secondary light on", turning on the secondary light source, turning off the main light source, wherein the light is transferred by the secondary light source to a secondary light guiding element, the secondary light guiding element guides the light towards a side or a rear of the lighting lamp, and the light is emitted after being reflected by a wall.

The advantages and effects of the technical solutions of the present disclosure are provided as follows.

According to the lighting lamp, when the main light-emitting component is turned on, lights emitted by the main light emitting element go out from the front of the lighting lamp, which can meet a direct lighting requirement of the light, an intensity of the light is high, which is suitable for large lighting conditions. When the secondary light-emitting component is turned on, lights emitted by the secondary light-emitting component go out from the side or the rear of the lighting lamp to avoid direct lighting of the light, the light can be reflected or diffused through the wall or other surrounding objects, the intensity of the light is greatly reduced, a uniformity of the light is better, the light is softer, which is more suitable for low lighting conditions. A main lamp and an ambient light are separated from each other and are controlled independently, which can meet different lighting requirements of users and has a good light comfort.

BRIEF DESCRIPTION OF THE DRAWINGS

For a more complete understanding, reference is now made to the following description taken in conjunction with the accompanying Drawings in which.

The drawings herein show the specific embodiments of the technical solution described in the present disclosure, and forms a part of the specification with the specific embodiments to explain the technical solutions, principles and technical effects of the present disclosure.

Unless specifically explained or other definitions, the same number represents same or similar technical features in different drawings, different numbers may also be represented to the same or similar technical features.

DESCRIPTION OF REFERENCE NUMERALS 11, mounting bracket; 12, ceiling mounting bracket; 13, lamp panel; 14, base; 141, annular boss; 1411 circumferential side wall; 142, heat dissipation frame; 20, main light source; 21, main light guiding element; 30, secondary light source; 31, secondary light guiding element; 311, lateral light guiding edge; 312, rear light guiding edge; 313, annular groove; 40, frame; 41, screw; 50, power supply.

DETAILED DESCRIPTION

In order to facilitate the understanding of the present disclosure, the present disclosure is described more comprehensively below with reference to the relevant accompanying drawings.

Unless specifically stated or otherwise defined, all technical and scientific terms used herein have the same meanings as those commonly understood by those skilled in the technical field of the present disclosure. All technical and scientific terms used herein may also have meanings corresponding to the purpose of realizing the technical solutions of the present disclosure in combination with the actual scenarios of the technical solutions of the present disclosure.

Unless specifically stated or otherwise defined, the "first" and "second" involved in the present application only are used for the distinction of names, but do not represent a specific quantity and order.

Unless specifically stated or otherwise defined, as used herein, the term "and/or" includes any and all combinations of one or more related listed items.

It should be noted that when an element is called "fixed to" another element, it can be directly fixed to another element or there may be intermediate elements. When an element is considered to be "connected to" another element, it can be directly connected to another element or there may be intermediate elements at the same time. When an element is considered to be "mounted to" another element, it can be directly mounted to another element or there may be intermediate elements at the same time. When an element is considered to be "disposed on" another element, it can be directly disposed on another element or there may be intermediate elements at the same time.

Unless specifically stated or otherwise defined, the "said" and "the" used herein relate to the aforementioned technical feature or the technical content, the technical feature or technical content may be the same as or similar to the aforementioned technical feature or technical content.

It should be understood that technical contents or technical features that go against the purpose of the present disclosure, or are obviously contradictory, should be excluded.

First Embodiment

Figure 1:
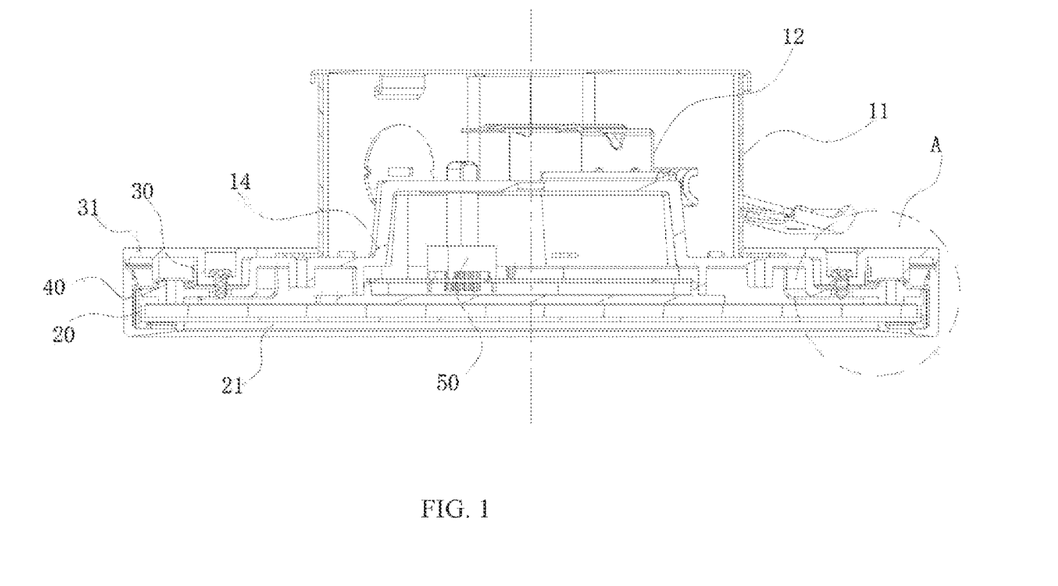
FIG. 1 is a cross-sectional view of a household lighting lamp according to a first embodiment of the present disclosure.
Figure 2:
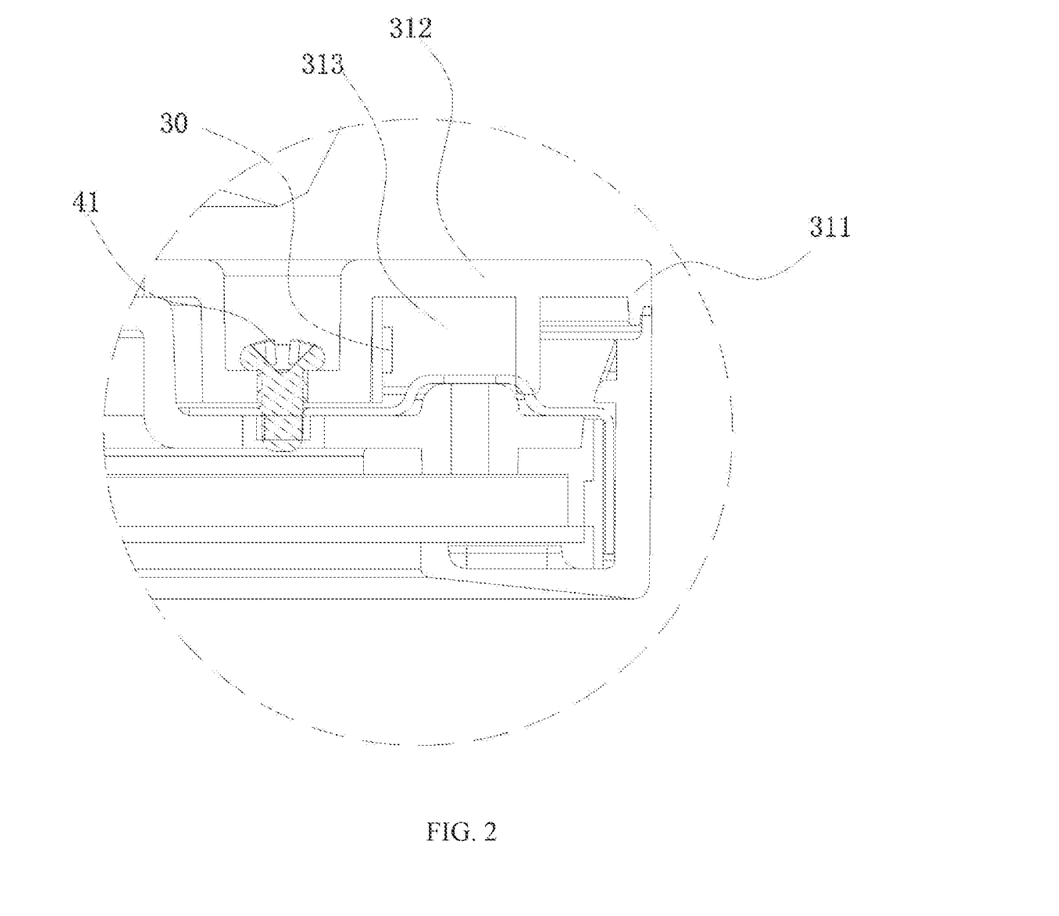
FIG. 2 is an enlarged view of the circled portion A of FIG. 1.
Figure 3:
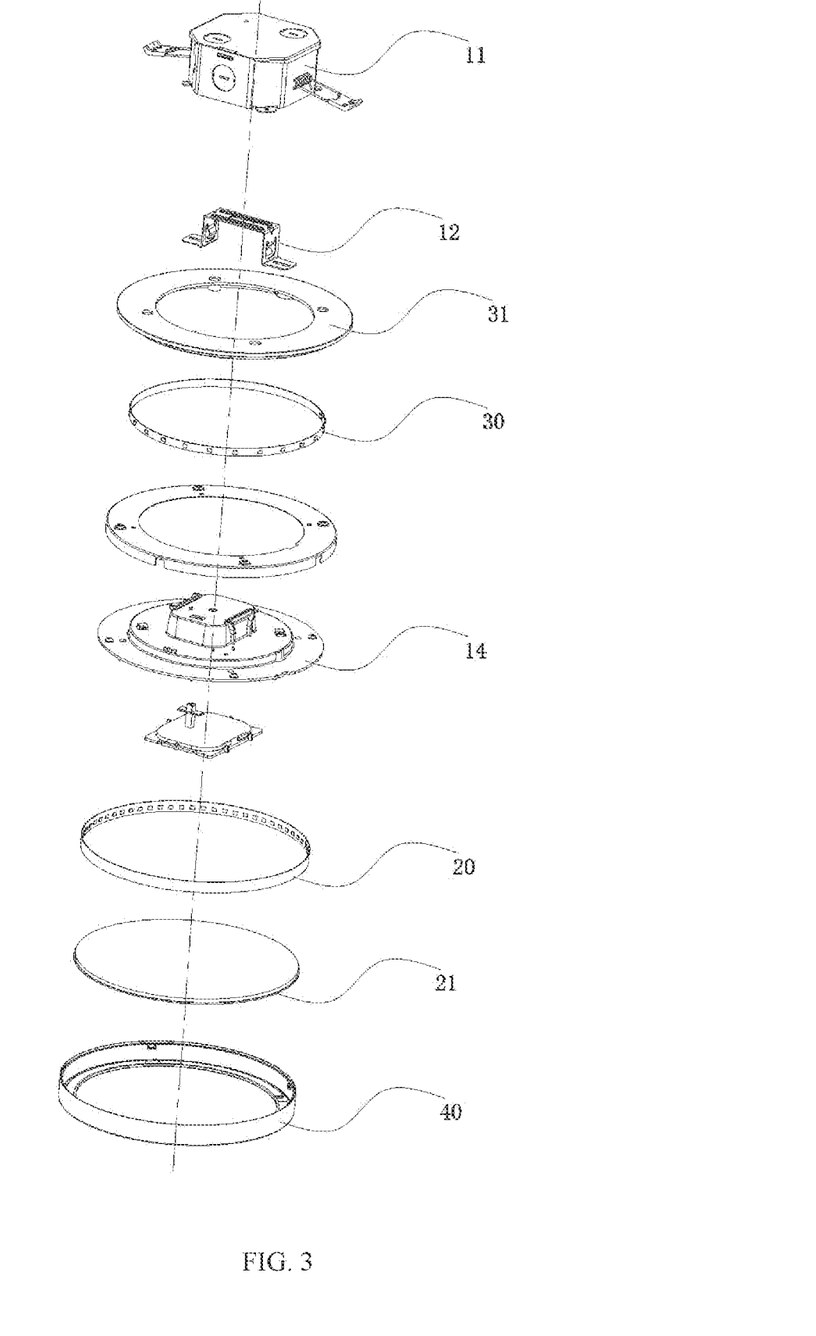
FIG. 3 is an exploded view of the household lighting lamp according to the first embodiment of the present disclosure.

As shown in FIG. 1 to FIG. 3, a household lighting lamp is provided. The household lighting lamp in this embodiment is a downlight including a lamp holder formed by a mounting bracket 11, a ceiling mounting bracket 12, and a base 14 that are fixed to each other. A front side of the base 14 is provided with a front panel, a rear side of the lamp holder is provided with a mounting portion for fixing the household lighting lamp.

A main light guiding element 21 including three-piece light guiding components is provided in front of the base 14. A main light source 20 is provided around an edge of the main light guiding element 21, that is, a light strip is provided around a circumferential direction of the main light guiding element 21. A frame 40 is provided around a circumferential direction of the main light source 20.

An annular cover plate is provided at a rear side of the base 14. The annular cover plate is a secondary light guiding element 31. A front side of the annular cover plate is provided with an annular groove 313, a secondary light source 30 is received in the annular groove 313. The annular cover plate is fixed to the base 14 by screws, the annular cover plate has a lateral light guiding edge 311 and a rear light guiding edge 312.

A power module is mounted in the lamp holder. Both the main light source 20 and the secondary light source 30 are electrically connected to a control circuit including the power module.

A distance between the main light guiding element 21 and an outer edge is less than a distance between the secondary light guiding element 31 and the outer edge, which can ensure that lights emitted by the main light source 20 go outs to the front of the lighting lamp as much as possible. On the other hand, the light emitted by the secondary light source 30 can also be prevented from being blocked when it go outs to the front of the lighting lamp.

A method for controlling a household lighting lamp according to an embodiment is provided.

The control circuit receives a control signal for controlling the main light source 20 or the secondary light source 30, for example:

In the case of insufficient light at night, a strong lighting mode needs to be turned on, at this time, when a "main light on" signal is output through a switch, turning on the main light source 20, turning off the secondary light source 30, the light is transferred by the main light source 20 to the main light guiding element 21, and the main light guiding element 21 guides the light towards the front of the lighting lamp.

A weak lighting mode needs to be turned on before going to bed, at this time, when a "secondary light on" signal is output through the switch, turning on the secondary light source 30, turning off the main light source 20, the light is transferred by the secondary light source 30 to the secondary light guiding element 31, the secondary light guiding element 31 guides the light away towards the side and the rear of the lighting lamp, and the light is emitted after being reflected by a wall, at this time, the light is very weak, and the light does not go in a straight line, but is reflected by the side or rear wall before going away.

It should be understood that, in this embodiment, in order to add more lighting modes, the main light source 20 and the secondary light source 30 can be turned on at the same time through the control circuit, or the main light source 20 and the secondary light source 30 can be turned on intermittently. The signal can be controlled in the embodiment by the switch with a built-in control chip, or by a simple input control mode.

Compared with the existing lighting lamps, the lighting lamp of this embodiment has obvious advantages.

When a main light-emitting component is turned on, lights emitted by the main light emitting element go out from the front of the lighting lamp, which can meet a direct lighting requirement of the light, an intensity of the light is high, which is suitable for large lighting conditions. When a secondary light-emitting component is turned on, lights emitted by the secondary light-emitting component go out from the side or the rear of the lighting lamp to avoid direct lighting of the light, the light can be reflected or diffused through the wall or other surrounding objects, the intensity of the light is greatly reduced, a uniformity of the light is better, the light is softer, which is more suitable for low lighting conditions. A main lamp and an ambient light are separated from each other and are controlled independently, which can meet different lighting requirements of users and has a good light comfort.

Second Embodiment

Figure 4:
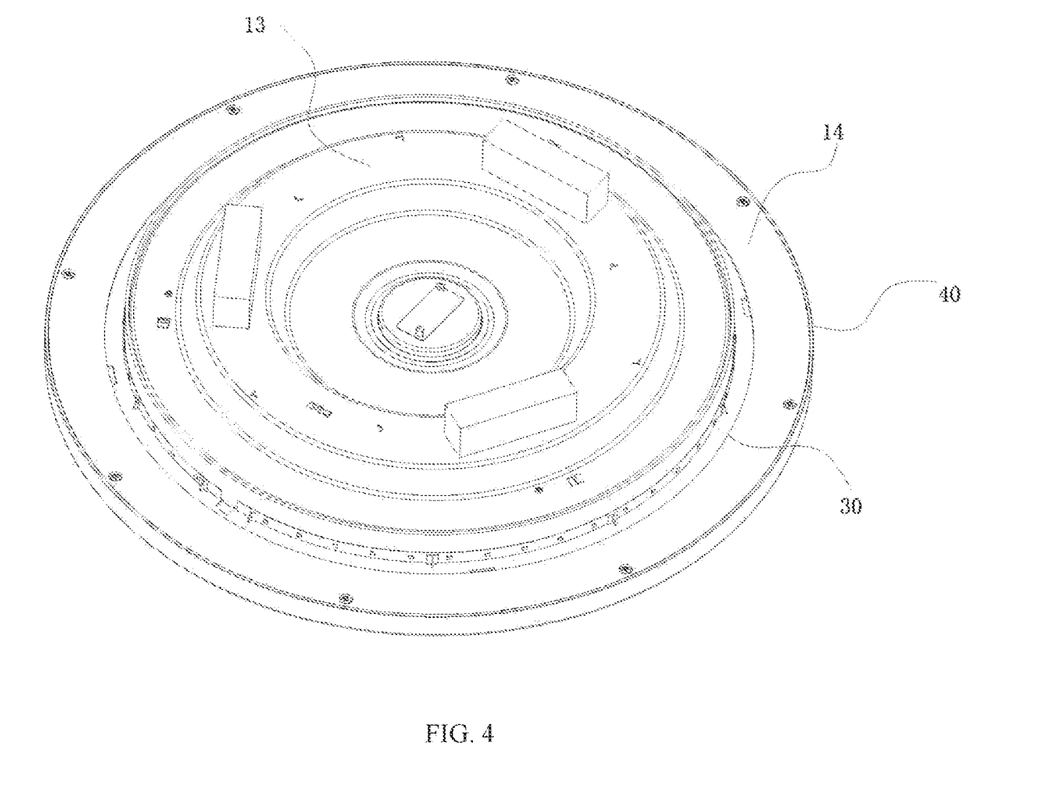
FIG. 4 is a rear view of a household lighting lamp according to a second embodiment of the present disclosure.
Figure 5:
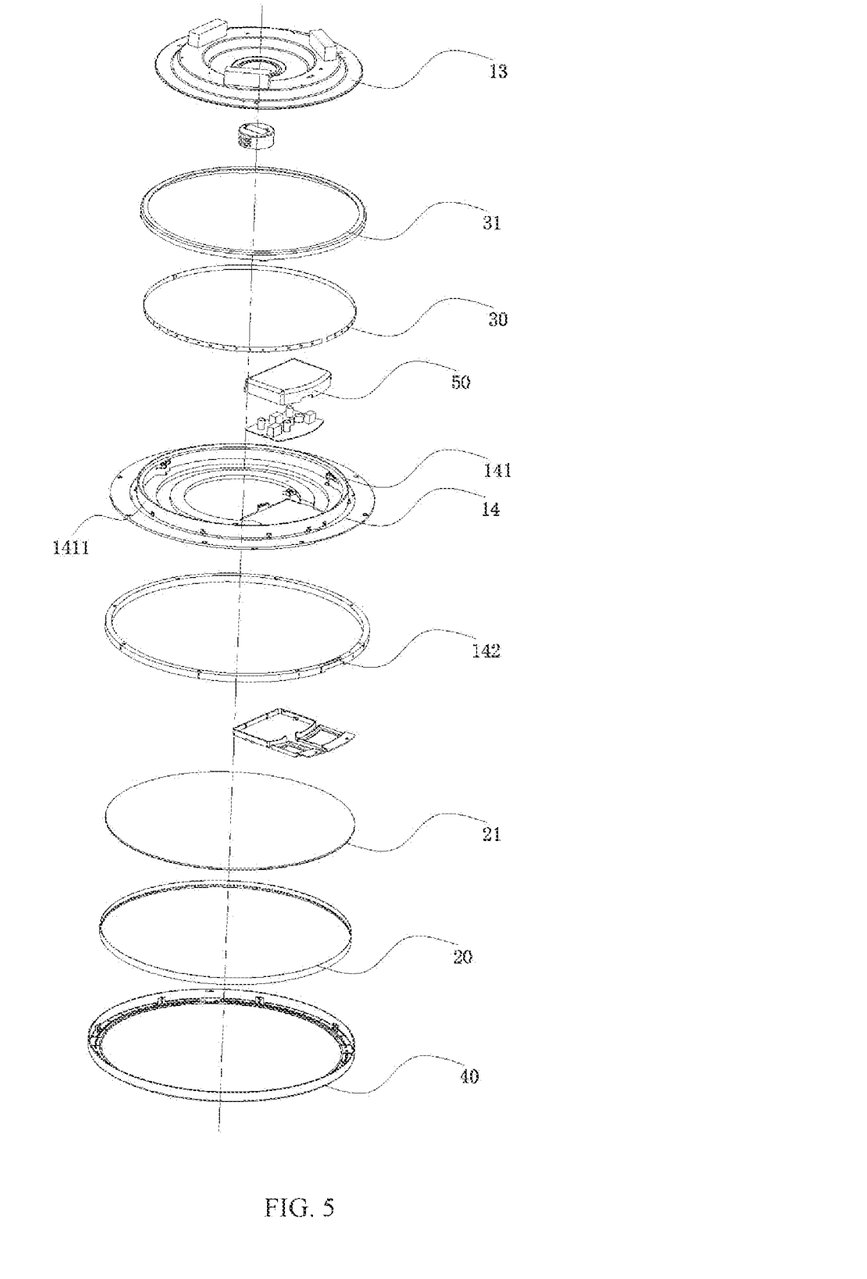
FIG. 5 is an exploded view of the household lighting lamp according to the second embodiment of the present disclosure.

As shown in FIG. 4 and FIG. 5. the household lighting lamp in this embodiment is a ceiling lamp, which includes a lamp holder formed by fixing a lamp panel 13 to a base 14. The lamp panel 13 is configured to fix the lighting lamp to a wall.

An annular boss 141 is provided on a rear side of the base 14, an outer periphery of the annular boss 141 has a circumferential side wall 1411. A heat dissipation frame 142 is provided on the circumferential side wall 1411. The secondary light source 30 is a light strip wound on the heat dissipation frame 142. The secondary light guiding element 31 is a light guiding ring latched on an outer side of the circumferential side wall 1411.

The principles and advantages of this embodiment are similar to those of the first embodiment, and are not repeated herein.

In the aforementioned embodiment, the main light source 20 forms a light-guiding connection with the main light guiding element 21. and the secondary light source 30 forms a light-guiding connection with the secondary light guiding element 31, functions of which includes that the light emitted by the main light source 20 enters the main light guiding element 21 and is guided away through the main light guiding element 21, the light emitted by the secondary light source 30 enters the secondary light guiding element 31 and is guided away through the secondary light guiding element 31, the main light source 20 and the main light guiding element 21, and the secondary light source 30 and the secondary light guiding element 31 may be mounted in direct contact or non-contact.

The purpose of the above embodiments is to exemplarily reproduce and derive the technical solution of the present disclosure, and to fully describe the technical solution, purpose and effect of the present disclosure, the purpose is to enable a person skilled in the art to understand the present disclosure more thoroughly and comprehensive, and does not limit the protection scope of this technical solution.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

What is claimed is:

1. A household lighting lamp, comprising a lamp holder, a main light-emitting component, and a secondary light-emitting component, a front side of the lamp holder being provided with a front panel, a rear side of the lamp holder being provided with a mounting portion, the main light-emitting component being provided in front of the lamp holder, the secondary light-emitting component being provided at a rear and/or side of the lamp holder, both the main light-emitting component and the secondary light-emitting component being electrically connected to a control circuit;
wherein the lamp holder has an outer edge, the main light-emitting component comprises a main light source and a main light guiding element, the secondary light-emitting component comprises a secondary light source and a secondary light guiding element, a distance between the main light guiding element and an outer edge is less than a distance between the secondary light guiding element and the outer edge, and the main light guiding element and the lamp holder are coaxially arranged, the main light source is electrically connected to the control circuit, and the main light guiding element is located in front of the lamp holder, the main light guiding element is a main light guiding plate, the main light source is provided at a lateral edge of the main light guiding element, and forms a light-guiding connection with the main light guiding element.

2. The household lighting lamp of claim 1, further comprising a frame, wherein the main light source is provided on an inner side of the frame and surrounds an outer edge of the main light guiding plate.

3. The household lighting lamp of claim 1, wherein the secondary light-emitting component comprises the secondary light source and the secondary light guiding element, the secondary light source is electrically connected to the control circuit, the secondary light guiding element is provided at a rear or at a side of the lamp holder, and the secondary light source forms a light-guiding connection with the secondary light guiding element.

4. The household lighting lamp of claim 3, wherein an annular boss is provided on the rear side of the lamp holder, the secondary light source is located on the annular boss, and the secondary light guiding element is located on the rear and/or side of the annular boss.

5. The household lighting lamp of claim 4, wherein an outer periphery of the annular boss has a circumferential side wall, the secondary light source is a light strip wound on the circumferential side wall, the secondary light guiding element is a light guiding ring latched on an outer side of the circumferential side wall.

6. The household lighting lamp of claim 3, wherein the secondary light guiding element is an annular cover plate provided on the rear side of the lamp holder, a front side of the annular cover plate is provided with an annular groove, the secondary light source is provided in the annular groove, the annular cover plate at least has a lateral light guiding edge.

\* \* \* \* \*